W. V. LETHERBURY.
COFFEE AND TEA POT.
APPLICATION FILED SEPT. 14, 1909.
975,542.
Patented Nov. 15, 1910.
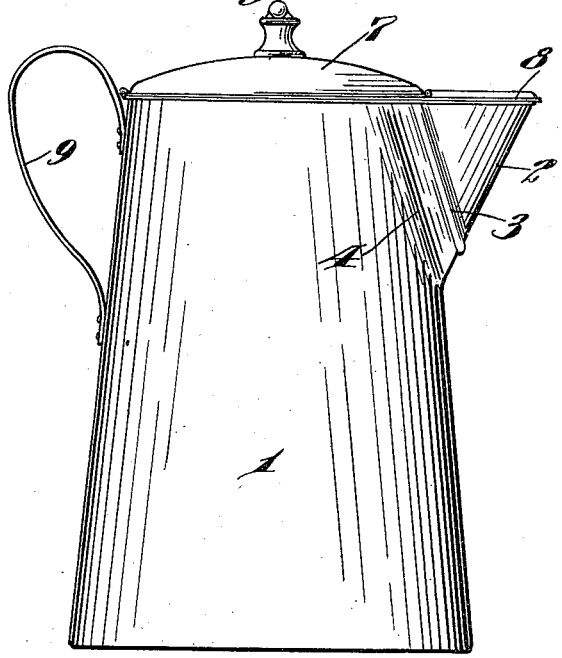
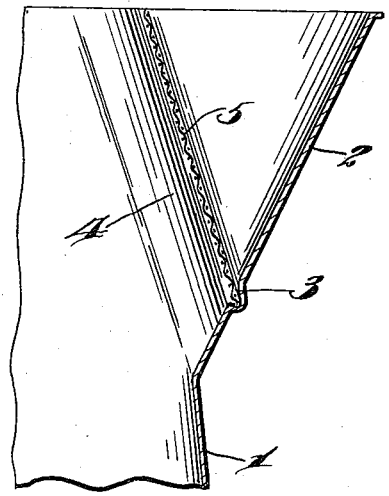
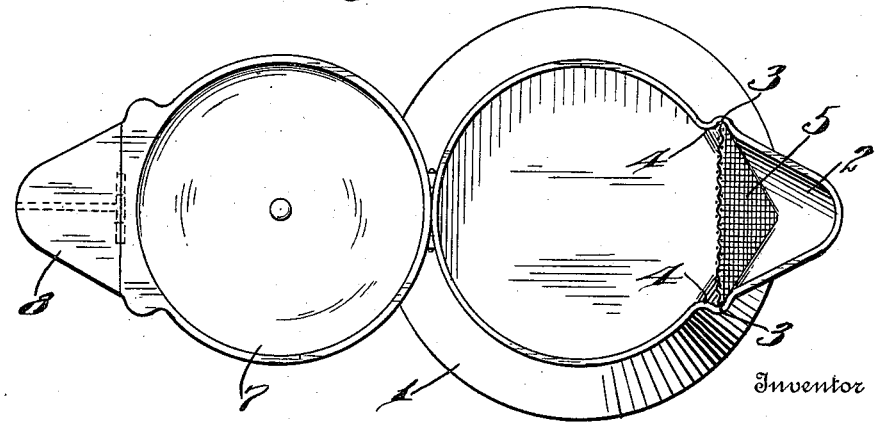
Witnesses
Theo. Reemann
J. C. L. Mulhall
Inventor
William V. Letherbury,
By Joshua R. H. Potts.
Attorney

UNITED STATES PATENT OFFICE.

WILLIAM V. LETHERBURY, OF HAGERSTOWN, MARYLAND.

COFFEE AND TEA POT.

975,542.  Specification of Letters Patent.  Patented Nov. 15, 1910.

Application filed September 14, 1909. Serial No. 517,559.

*To all whom it may concern:*

Be it known that I, WILLIAM V. LETHERBURY, a citizen of the United States, residing at Hagerstown, in the county of Washington and State of Maryland, have invented certain new and useful Improvements in Coffee and Tea Pots, of which the following is a specification.

My invention relates to improvements in coffee and tea pots, the object of the invention being to provide an improved construction of casing and spout formed integrally from a single piece of sheet metal, and one in which a strainer is normally held in a grooved portion of the spout, and which may be readily removed, allowing the spout to be cleaned thoroughly with the pot, making the device a sanitary one, and one in which no partition is provided between the spout and pot other than the screen or strainer.

With this and other objects in view, the invention consists in certain novel features of construction, and combinations and arrangements of parts as will be more fully hereinafter described and pointed out in the claim.

In the accompanying drawings, Figure 1, is a view in side elevation illustrating my improvements. Fig. 2, is an enlarged fragmentary view in vertical section, and Fig. 3, is a top plan view showing the cover in open position.

1 represents the body of the coffee pot, which is bent into substantially the shape shown, and from this body portion the spout 2 is stamped or drawn outward, but integral with the body 1, said spout being bent as shown at 3 from a point at its upper edge all around the spout back to a point at its upper edge opposite the first point referred to, and said portion 3 being approximately parallel with the curve or line of demarcation between the spout and the body portion as illustrated at 4. This grooved portion 3 is adapted to receive therein a screen or strainer 5, which latter is preferably of wire netting, but may be of other material, and is of general triangular shape to fit the spout and serve as a perforated partition between the spout and the pot, compelling all coffee or tea which passes out through the spout to pass through the strainer before doing so.

7 represents a cover adapted to fit the body portion, and extend partly over the open upper end of the spout far enough to project over the upper end of the strainer 5, and provided with a hinged door or extension 8 covering the outer end of the spout, and which latter will be opened by the pressure of liquid flowing outward, but normally closed to prevent the entrance of dust and foreign matter.

The pot is of course provided with a handle, a simple form being shown at 9, and may be designed and ornamented in various ways, and might of course be made of material other than metal.

With my improvements it will be noted that when it is desired to clean the pot, the strainer 5 can be drawn out of its spout and thoroughly cleaned, and the spout and the pot can both be thoroughly cleaned, as cleaning devices can be readily passed up and down the spout and throughout the interior of the pot.

Various slight changes might be made in the general form and arrangements of parts described without departing from my invention, and hence I do not restrict myself to the precise details set forth, but consider myself at liberty to make such changes and alterations as fairly fall within the spirit and scope of the claim.

Having thus described my invention what I claim as new and desire to secure by Letters Patent is:

A pot of the character described, comprising a body, a spout integral with the body, projecting outward from the body at its upper portion, and said spout bent forming an internal groove extending around the spout at a point removed from the body, and on a line approximately parallel with the line of demarcation between the spout and the body portion, a removable strainer located in the groove in the spout, a cover on said body, having an extension projecting over the grooved portion of the spout and disposed above the strainer, and a hinged section on said cover normally closing the outer end of the spout, substantially as described.

In testimony whereof I have signed my name to this specification in the presence of two subscribing witnesses.

WILLIAM V. LETHERBURY.

Witnesses:
　FRANK P. SEARFOSS,
　GEO. D. SHEEHY.